United States Patent
Herron et al.

(10) Patent No.: US 11,653,628 B1
(45) Date of Patent: May 23, 2023

(54) BLUETOOTH LOW ENERGY TRACKING TAGS FOR CATTLE TRACKING

(71) Applicant: MICROTRAKS, INC., San Antonio, TX (US)

(72) Inventors: Patrick Herron, Austin, TX (US); Michael Fregeau, San Antonio, TX (US)

(73) Assignee: MICROTRAKS, INC., San Antonio, TX (US)

( * ) Notice: Subject to any disclaimer, the term of this patent is extended or adjusted under 35 U.S.C. 154(b) by 65 days.

(21) Appl. No.: 17/533,494

(22) Filed: Nov. 23, 2021

(51) Int. Cl.
*G06K 19/07* (2006.01)
*H04W 4/80* (2018.01)
*G06K 19/077* (2006.01)
*A01K 11/00* (2006.01)
*A01K 29/00* (2006.01)

(52) U.S. Cl.
CPC .......... *A01K 11/006* (2013.01); *A01K 29/005* (2013.01); *G06K 19/071* (2013.01); *G06K 19/0723* (2013.01); *G06K 19/07762* (2013.01); *G06K 19/07786* (2013.01); *H04W 4/80* (2018.02)

(58) Field of Classification Search
CPC ..... A01K 11/006; A01K 29/005; H04W 4/80; G06K 19/071; G06K 19/0723; G06K 19/07762; G06K 19/07786
See application file for complete search history.

(56) References Cited

U.S. PATENT DOCUMENTS

| | | | |
|---|---|---|---|
| 10,786,395 B1* | 9/2020 | Temkin | A61B 5/0022 |
| 2003/0104848 A1* | 6/2003 | Brideglall | G06K 7/0008 455/574 |
| 2010/0203831 A1* | 8/2010 | Muth | H02J 50/20 455/569.1 |
| 2016/0156603 A1* | 6/2016 | Janik | G06Q 20/401 726/7 |
| 2016/0241999 A1* | 8/2016 | Chin | G07C 9/00182 |
| 2019/0354734 A1* | 11/2019 | Forster | G06K 19/0723 |

\* cited by examiner

*Primary Examiner* — Omer S Khan
(74) *Attorney, Agent, or Firm* — Dickinson Wright PLLC

(57) ABSTRACT

Tracking tag and method for cattle tracking. The tracking tag includes, in some implementations, a near-field communication (NFC) module, a battery module, and a Bluetooth module. The NFC module is programmed with a unique identifier. The battery module is coupled to the NFC module. The battery module is configured to supply battery energy when active. The battery module is also configured to activate when the NFC module is first read after being programmed with the unique identifier. The Bluetooth module is coupled to the battery module. The Bluetooth module is configured to receive the battery energy from the battery module. The Bluetooth module is also configured to transmit the unique identifier using a Bluetooth Low Energy (BLE) transmission protocol.

12 Claims, 8 Drawing Sheets

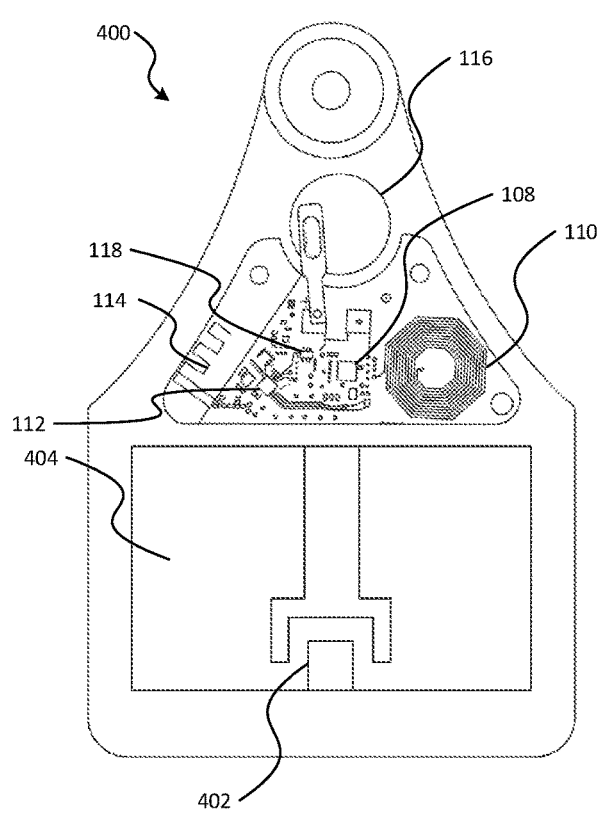
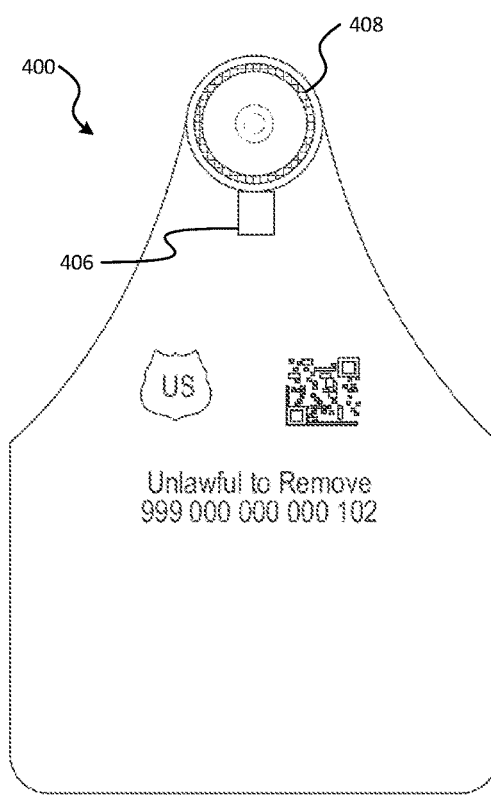
FIG. 4A
FIG. 4B

BLUETOOTH LOW ENERGY TRACKING TAGS FOR CATTLE TRACKING

BACKGROUND

To control and eradicate animal diseases, Federal regulations require proper identification of animals to trace their movements. To this end, cattle ranchers attach a tracking tag to the back, hip, or ear of each animal that indicates an official identification number assigned to that animal. To facilitate automated tracking, many cattle tracking systems utilize ultra-high frequency (UHF) tags. However, UHF-based cattle tracking systems provides several challenges. For example, while UHF tags are cheap, the infrastructure needed to implement a UHF-based cattle tracking system is expensive and complex. Another challenge of UHF is that UHF readers are incapable of identifying a specific animal's UHF tag when several animals are clustered together. Thus, UHF-based cattle tracking systems do not provide tractability at the user level.

SUMMARY

There is a need for cheaper and easier to implement cattle tracking systems. Bluetooth Low Energy (BLE) and near-field communication (NFC) are widely adopted in mainstream electronics. For example, most mobile phones and smart watches include BLE and NFC readers. The ubiquitous adoption of BLE enables the implementation of BLE-based tracking systems whose infrastructure is much cheaper and less complex than UHF-based tracking systems. Unlike UHF tags which do not require a battery, BLE tags require a battery. Thus, despite their long battery life, BLE tags have not been widely adopted for cattle tracking due to the logistical complications added by having battery-powered tags. To take advantage of the cheaper and easier to implement infrastructure of a BLE-based tracking system, the present disclosure provides tracking tags and methods for cattle tracking that, among other things, use BLE with an autonomous power supply that operates throughout the lifespan of an animal.

There is also need for traceability at the user level. Thus, the present disclosure also provides tracking tags and methods of tracking cattle that, among other things, use NFC to allow a user to scan a tracking tag on an individual animal with, e.g., their mobile phone.

For example, the present disclosure provides a tracking tag for cattle tracking. The tracking tag includes, in some implementations, an NFC module, a battery module, and a Bluetooth module. The NFC module is programmed with a unique identifier. The battery module is coupled to the NFC module. The battery module is configured to supply battery energy when active. The battery module is also configured to activate when the NFC module is first read after being programmed with the unique identifier. The Bluetooth module is coupled to the battery module. The Bluetooth module is configured to receive the battery energy from the battery module. The Bluetooth module is also configured to transmit the unique identifier using a BLE transmission protocol.

The present disclosure also provides a method for cattle tracking with a tracking tag. The tracking tag includes, in some implementations, an NFC module, a battery module, and a Bluetooth module. The method includes programming the NFC module with a unique identifier. The method also includes performing a first read of the NFC module after the NFC module is programmed with the unique identifier. The method further includes, responsive to the first read, activating the battery module to supply battery energy to the Bluetooth module. The method also includes transmitting the unique identifier from the Bluetooth module using a BLE transmission protocol.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description, taken in conjunction with the accompanying drawings. It is emphasized that, according to common practice, the various features of the drawings are not necessarily to-scale. On the contrary, the dimensions of the various features may be—and typically are—arbitrarily expanded or reduced for the purpose of clarity.

FIG. 4A is a front view of an example of an ear tag, in accordance with some implementations of the present disclosure.

FIG. 4B is a back view of an example of an ear tag, in accordance with some implementations of the present disclosure.

NOTATION AND NOMENCLATURE

Figure 1:
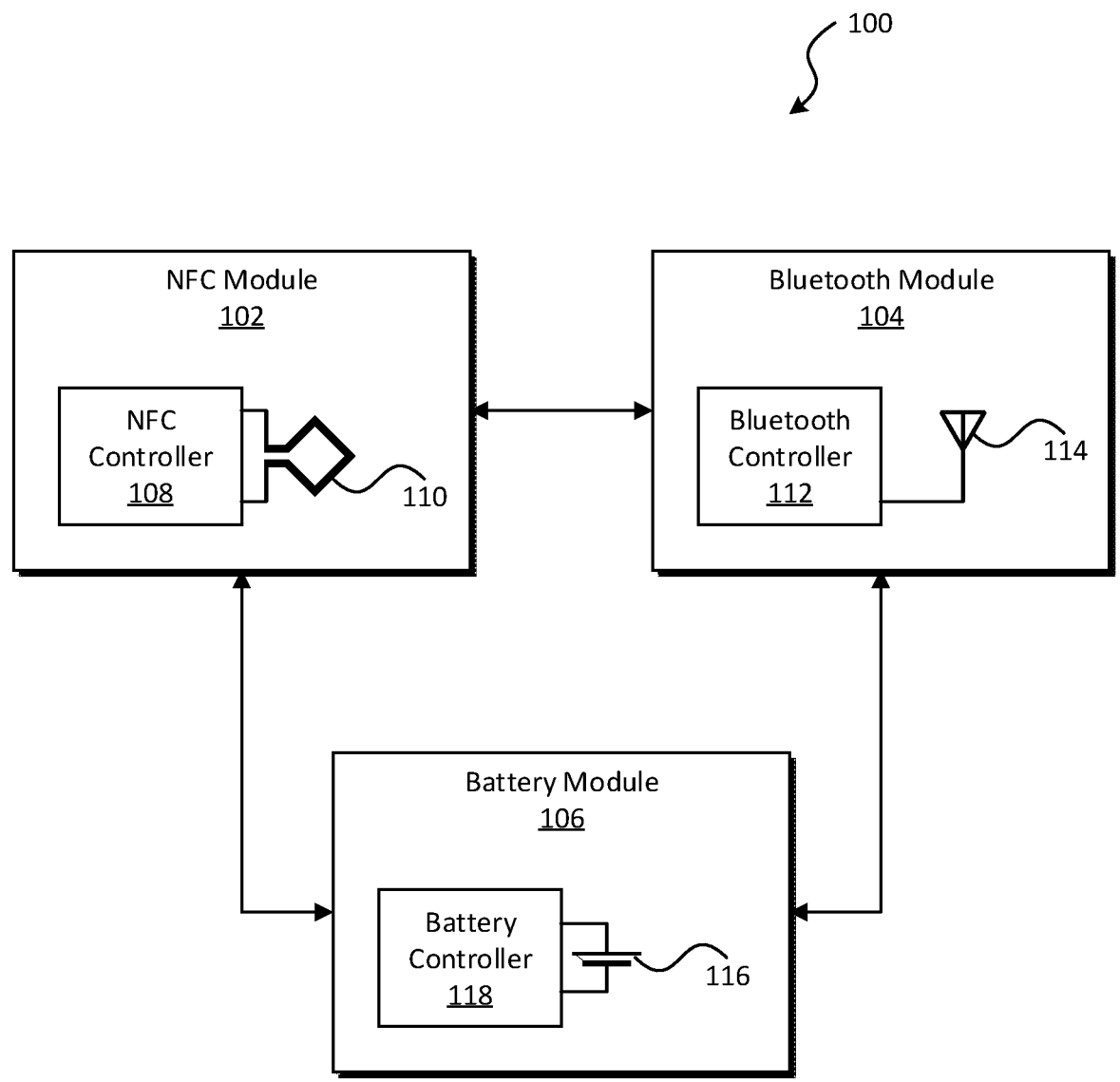
FIG. 1 is a block diagram of an example of a tracking tag for cattle tracking, in accordance with some implementations of the present disclosure.

Various terms are used to refer to particular system components. A particular component may be referred to commercially or otherwise by different names. Further, a particular component (or the same or similar component) may be referred to commercially or otherwise by different names. Consistent with this, nothing in the present disclosure shall be deemed to distinguish between components that differ only in name but not in function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The terminology used herein is for the purpose of describing particular example implementations only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example implementations. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "up," "upper," "top," "bottom," "down," "inside," "outside," "contained within," "superimposing upon," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

"Real-time" may refer to less than or equal to 2 seconds. "Near real-time" may refer to any interaction of a sufficiently short time to enable two individuals to engage in a dialogue via such user interface, and will generally be less than 10 seconds (or any suitable proximate difference between two different times) but greater than 2 seconds.

DETAILED DESCRIPTION

The following discussion is directed to various implementations of the present disclosure. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the disclosure, including the claims, is limited to that implementation.

FIG. 1 is a block diagram of an example of a tracking tag 100 for cattle tracking. The tracking tag 100 illustrated in FIG. 1 includes a near-field communication module (i.e., NFC module 102), a Bluetooth module 104, and a battery module 106. The tracking tag 100 illustrated in FIG. 1 is provided as one example of such a tag. The tracking tag 100 may include fewer, additional, or different components in different configurations than the tracking tag 100 illustrated in FIG. 1. For example, in some implementations, the tracking tag 100 may also include a radio-frequency identification (RFID) chip as will described below in more detail.

The NFC module 102 is configured to interface with external NFC readers and provide a unique identifier of the tracking tag 100 to the external NFC readers. In some implementations, the unique identifier includes an animal identification number (AIN) as will be described below in more detail. The NFC module 102 illustrated in FIG. 1 includes an NFC controller 108 and an NFC coil 110. The NFC controller 108 may include an NFC tag integrated circuit (IC) with a non-volatile memory (e.g., an electronically-erasable programmable read-only memory (EEPROM)) for storing the unique identifier. In some implementations, the NFC controller 108 may include an ST25DV04K Dynamic NFC/RFID tag IC with EEPROM from STMicroelectronics. While an external NFC reader reads the unique identifier from the NFC module 102, the NFC module 102 harvests radio-frequency energy from the external NFC reader and supplies the radio-frequency energy to the Bluetooth module 104. For example, to read the unique identifier from the NFC module 102, an external NFC reader generates a radio-frequency field that energizes the NFC coil 110. While the NFC coil 110 is energized, the NFC controller 108 receives radio-frequency energy which the NFC controller 108 supplies to the Bluetooth module 104. In some implementations, the NFC module 102 supplies the radio-frequency energy to the Bluetooth module 104 via a diode (not shown).

Figure 2:
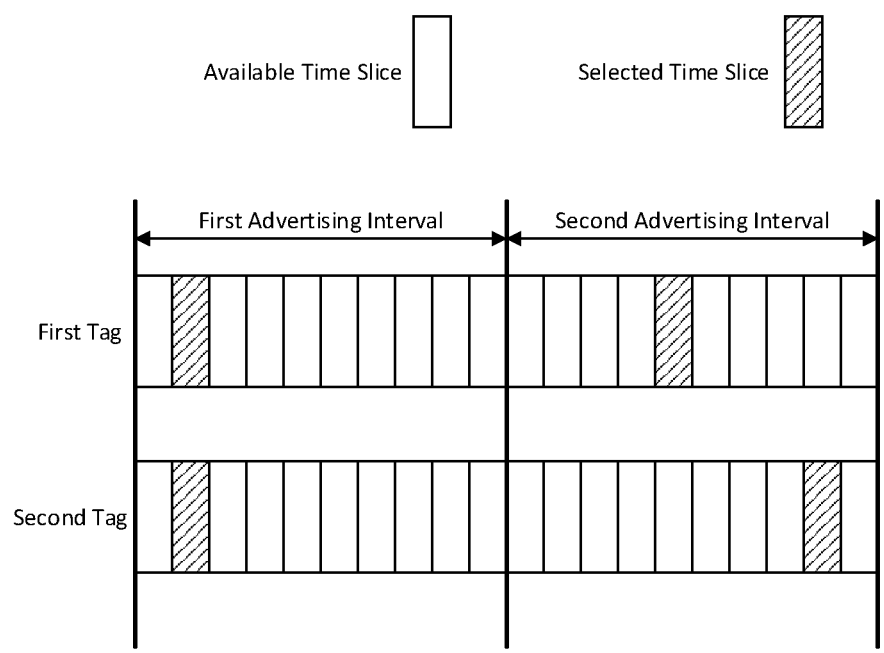
FIG. 2 is an example of timing diagrams for two tags, in accordance with some implementations of the present disclosure.

The Bluetooth module 104 is configured to interface with external Bluetooth readers and transmit the unique identifier of the tracking tag 100 to the external Bluetooth readers via a Bluetooth Low Energy (BLE) transmission protocol. The Bluetooth module 104 illustrated in FIG. 1 includes a Bluetooth controller 112 and an antenna 114. In some implementations, the Bluetooth controller 112 includes an ARM microcontroller. For example, the Bluetooth controller 112 may include an NRF52805-CAAA microcontroller from Nordic Semiconductor. In some implementations, the antenna 114 includes a 2.4 gigahertz printed circuit board (PCB) antenna. In alternate implementations, the antenna 114 may include another type of antenna that is configured for Bluetooth communication. The Bluetooth module 104 may include fewer, additional, or different components in different configurations than the Bluetooth module 104 illustrated in FIG. 1. For example, in some implementations, the Bluetooth module 104 may also include an oscillator, a coupler for a Joint Test Action Group (JTAG) interface, a coupler for a Serial Wire Debug (SWD) interface, or a combination thereof The BLE transmission protocol may include a BLE beaconing protocol. For example, in some implementations, the Bluetooth module 104 transmits the unique identifier of the tracking tag 100 at a predetermined advertising interval (e.g., every three seconds). In alternate implementations, the Bluetooth module 104 transmits the unique identifier of the tracking tag 100 at different intervals to prevent collisions between multiple tracking tags 100. For example, the Bluetooth module 104 may set an advertising interval that including a plurality of time slices. During each instance of the advertising interval, the Bluetooth module 104 randomly selects one of the plurality of time slices and transmits the unique identifier during the selected time slice. To illustrate, FIG. 2 is an example of timing diagrams for two tags during two consecutive advertising intervals. Each of the two advertising intervals illustrated in FIG. 2 is divided into ten time slices. During the first advertising interval illustrated in FIG. 2, the first and second tags select the same time slice to transmit their unique identifiers (resulting in a collision). However, during the second advertising interval illustrated in FIG. 2, the first and second tags select different time slices to transmit their unique identifiers. Thus, collisions in consecutive advertising intervals are avoided.

Returning to FIG. 1, the battery module 106 is configured to supply battery energy to the Bluetooth module 104. For example the battery module 106 may supply a low voltage to the Bluetooth module 104 (e.g., 3 Volts). In some implementations, the battery module 106 also supplies battery energy to the NFC module 102. The battery module 106 illustrated in FIG. 1 includes a battery 116 and a battery controller 118. In some implementations, the battery 116 includes a coin cell (e.g., a 3 Volt CR2050 coin cell). While a single battery is illustrated in FIG. 1, in some implementations, the battery module 106 includes a plurality of batteries (or battery cells). In some implementations, the battery controller 118 is configured to monitor a charge level of the battery 116. For example, the battery controller 118 may measure the charge level of the battery 116 and provide an indication of the charge level, e.g., to the Bluetooth module 104. To conserve battery life, the battery module 106 is configured to activate when the NFC module 102 is first read after being programmed with the unique identifier. In some implementations, the battery controller 118 includes a switch (e.g., a diode) configured to activate and deactivate the battery module 106. When activate (or activated), the battery module 106 supplies battery energy to the Bluetooth module 104 (and the NFC module 102). Further, when not active (or deactivated), the battery module 106 does not supply battery energy to the Bluetooth module 104 (or the NFC module 102). In some implementations, the Bluetooth module 104 is configured to activate the battery module 106 when the Bluetooth module 104 receives radio-frequency energy from the NFC module 102. For example, the Bluetooth module 104 may provide a control signal to the battery controller 118 which causes the battery controller 118 to activate the battery module 106. In some implementations, the Bluetooth module 104 determines whether to active the battery module 106 based on the state of a register included in the NFC module 102. For example, the NFC module 102 may include a register that is not set until the NFC module 102 is first read by an external NFC reader. Upon turning on in response to receiving the radio-frequency energy, the Bluetooth module 104 reads the register in the NFC module 102. When the register is set, the Bluetooth module 104 provides a control signal to the battery controller 118 which causes the battery controller 118 to activate the battery module 106. After the battery module 106 is activated, the Bluetooth module 104 receives battery energy from the battery module 106. When the bit in the register in not set, the tracking tag 100 is only powered by the NFC module 102 harvesting radio-frequency energy. The NFC module 102 is often first read when the tracking tag 100 is attached to an animal. Thus, by keeping the battery module 106 inactive until the NFC module 102 is first read, the tracking tag 100 does not use battery energy until it is in active use. In some implementations, the battery 116 can power the tracking tag 100 for about two and a half years. Further, a cow (or calf) is typically in and out of the market within eighteen months. Thus, delaying activation of the battery module 106 allows the battery 116 to sufficiently power the tracking tag 100 throughout its useful lifespan without requiring specific intervention from a user.

Figure 3:
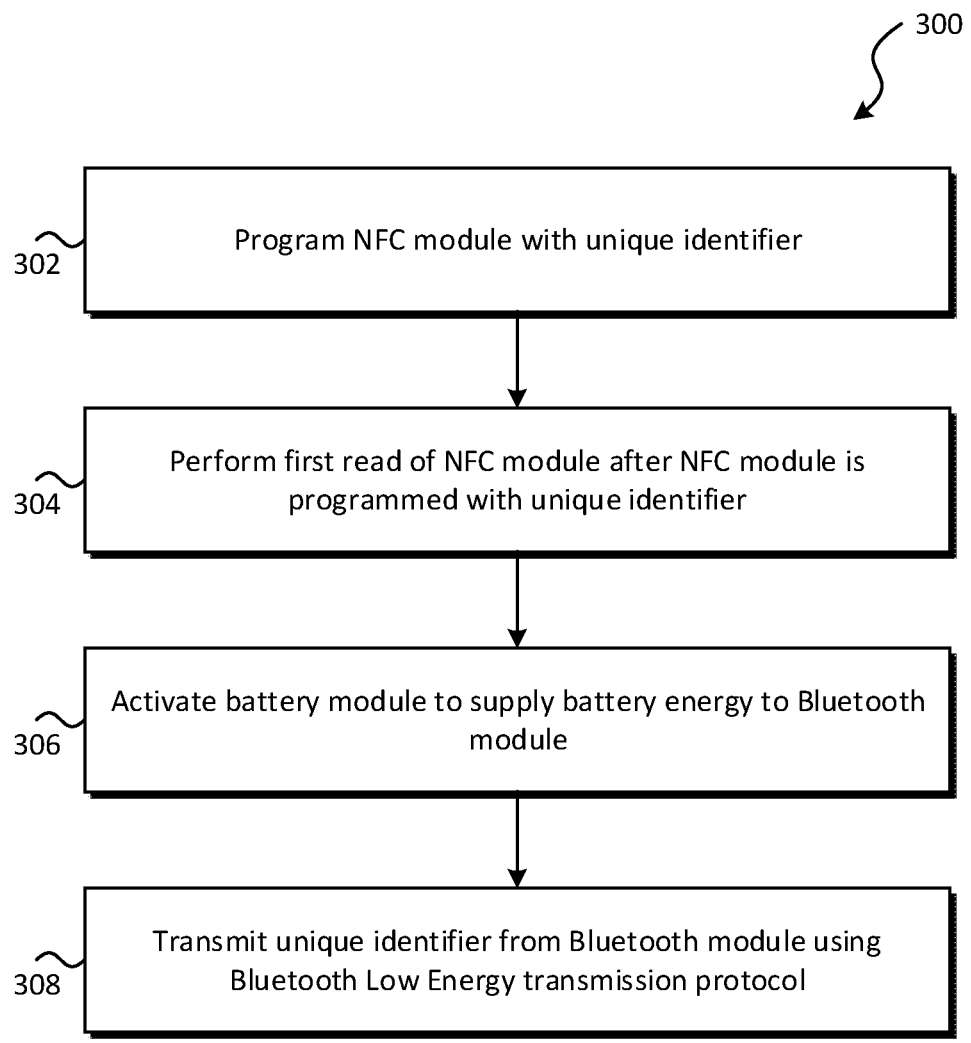
FIG. 3 is a flow chart of an example of a method for cattle tracking with a tracking tag, in accordance with some implementations of the present disclosure.

FIG. 3 is a flow chart of an example of a method 300 for cattle tracking with the tracking tag 100. In some implementations, the method 300 may be performed by one or more processing devices. For example, a manufacturing line in a manufacturing plant may include one or more computing devices storing computer instructions on one or more memory devices and executed by one or more processing devices. The computer instructions may cause the one or more processing devices to perform any combination of the operations described below when executed.

At block 302, the NFC module 102 is programmed with the unique identifier. For example, the NFC module 102 may include a non-volatile memory that stores the unique identifier. In some implementations, the unique identifier is (or includes) an animal identification number (AIN). AIN's are a numbering system for the official identification of individual animals in the U.S. providing a nationally unique identification number for each animal. The AIN contains fifteen digits, with the first three being the country code (e.g., 840 for the U.S.), the alpha characters U.S.A., or the numeric code assigned to the manufacturer of the identification device by the International Committee on Animal Recording.

At block 304, a first read of the NFC module 102 is performed after the NFC module 102 is programmed with the unique identifier. For example, an external NFC reader reads the NFC module 102 and receives the unique identifier stored in a non-volatile memory of the NFC controller 108. Responsive to the first read, the battery module 106 is activated to supply battery energy to the Bluetooth module 104 (at block 306). For example, during the first read, the NFC module 102 may harvest radio-frequency energy and supply the harvested radio-frequency energy to the Bluetooth module 104. Upon receiving the radio-frequency energy, the Bluetooth module 104 may activate the battery module 106, e.g., by sending a control signal thereto.

At block 308, the Bluetooth module 104 transmits the unique identifier using a BLE transmission protocol. For example, the Bluetooth module 104 may transmit the unique identifier with the antenna 114 using a BLE beaconing protocol (such as the ones previously described herein).

In some implementations, the tracking tag 100 further includes one or more RFID chips programmed with the unique identifier. For example, FIG. 4A is a front view of an example of the tracking tag 100 implemented as an ear tag 400. The ear tag 400 illustrated in FIG. 4A includes a first RFID chip 402 and a first antenna 404 for communicating the unique identifier to an external reader using ultra-high frequency (UHF). FIG. 4B is a back view of the ear tag 400. The ear tag 400 illustrated in FIG. 4B includes a second RFID chip 406 and a second antenna 408 for communicating the unique identifier to an external reader using low frequency (LF). The second antenna 408 is positioned around a portion of the ear tag 400 that clips to the ear of an animal. In some implementations, the tracking tag 100 includes RFID chips and antennas for communicating the unique identifier to an external reader using both UHF and LF as illustrated in FIGS. 4A and 4B. In alternative implementations, the tracking tag 100 only includes an RFID chip for communicating the unique identifier to an external reader using either UHF or LF.

By including Bluetooth, NFC, UHF, and LF, the tracking tag 100 uniquely provides the same traceable unique identifier regardless of the technology being used to query to the tracking tag 100. For example, when a rancher catches the head of an animal to administer a vaccine, the rancher may scan the NFC module 102 of the tracking tag 100 with their mobile phone to identify the animal and document the administration of the vaccine. As a further example, a rancher may scan the Bluetooth modules 104 of several tracking tags 100 with their mobile phone essentially simultaneously to identify a group of animals positioned in a holding pen. The tracking tag 100 may be dynamically configured such that the Bluetooth, the NFC, the UHF, and the LF all provide the same unique identifier.

The ear tag 400 illustrated in FIGS. 4A and 4B also includes the NFC controller 108, the NFC coil 110, the Bluetooth controller 112, the antenna 114, the battery 116, and the battery controller 118. In some implementations, one or more indicia of the unique identifier are laser-etched on the tracking tag 100. For example, the unique identifier and a matrix barcode that includes the unique identifier are laser-etched on the back side of the ear tag 400, as illustrated in FIG. 4B.

Figure 5A:
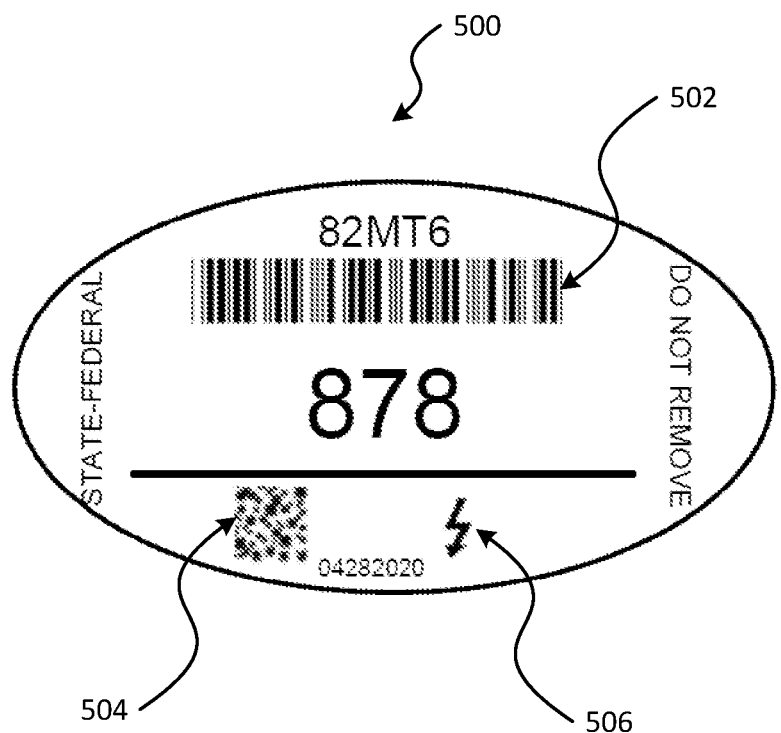
FIG. 5A is a front view of an example of a panel tag, in accordance with some implementations of the present disclosure.
Figure 5B:
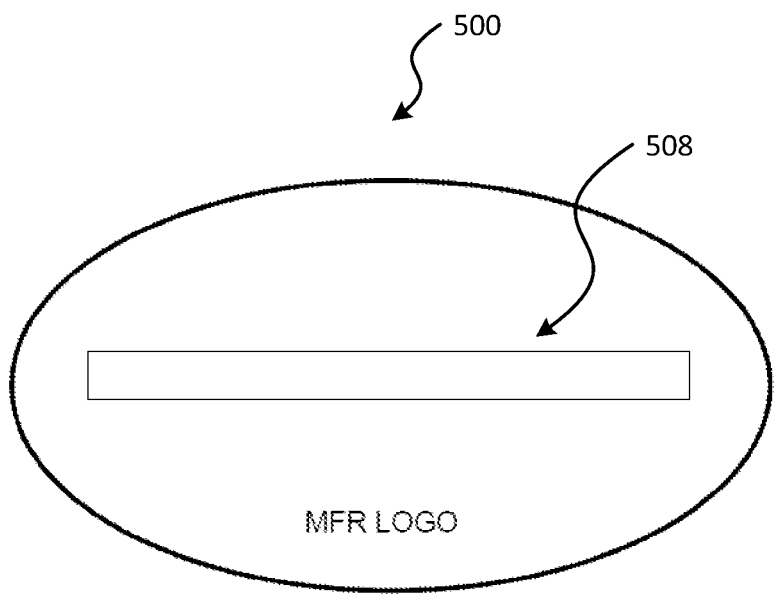
FIG. 5B is a back view of an example of a panel tag, in accordance with some implementations of the present disclosure.

The tracking tag 100 may also be implemented as a panel tag. For example, FIG. 5A is a front view of an example of the tracking tag 100 implemented as a panel tag 500. FIG. 5B is a back view of the panel tag 500. The following panel tag specification described below and depicted in FIGS. 5A and 5B is merely exemplary, and the exact dimensions shall not be construed to be the only dimensions disclosed. It will be apparent to one having ordinary skill in the art that similar tag assemblies adhering to the principles of the subject matter disclosed here may differ across various dimensions and nevertheless still embody the subject matter disclosed herein. For instance by being wider, narrower, longer, shorter, or varying somewhat in thickness.

Regarding color, in some implementations, the tracking tag 100 may be white (e.g., red: 250, green: 250, and blue: 250) or yellow (e.g., red: 245, green: 250, and blue: 75) on a printed side with black printing. The panel tag 500 may include an identification tag made of virgin paper. Virgin paper may use virgin fibers that create paper with higher absorbency rates, better ink color and retention, and softer and more durable options.

Regarding shape, in some implementations, the panel tag 500 may be oval in shape, three inches high by three and three-fourths inches wide as shown in FIGS. 5A and 5B. The long dimension of the panel tag 500 may be parallel to the grain of the paper. The large three-digit (e.g., "878" of FIG. 5A) or four-digit numbers may be positioned in the middle of the tracking tag. A solid black bar, one-eighth inch high may be one-eighth inch below the large numbers. The production date (e.g., "04282020" in FIG. 5A) may be eleven-sixteenths inch high and located below the bottom bar code. On the left end of the panel tag 500 the legend "State-Federal" may be printed. On the right end of the tag the legend "Do Not Remove" may be printed. The legend printing may be one-eighth inch high. Slight deviations from the standard dimensions may be allowed to accommodate inlay placement and die cutting allowances.

Regarding material, in some implementations, the panel tag 500 may be made of a waterproof paper stock and of sufficient wet strength and size, and an additive shall be included in the manufacture of the panel tag 500 to ensure the panel tag 500 does not curl when placed in a humidity chamber at eighty-three degrees Fahrenheit and eight-three percent relative humidity for twenty-four hours. In some implementations, the panel tag 500 withstands adverse weather conditions (extreme temperature, rain, snow and high humidity) for at least fourteen days without degradation.

Regarding print specifications, in some implementations, the front side of the panel tag 500 may be printed in accordance with the specifications and a logo or trademark of the manufacturer may be easily observed on the backside of the panel tag 500 (e.g., as shown in FIG. 5B). In some implementations, a silhouette of a cow (not shown) showing tracking tag placement may be printed on the backside of the panel tag 500. All printing may be with permanent, black ink and modified Gothic Type Style, although other colors and types of font may be used. The ink may not offset or smear when the panel tag 500 is padded together or the panel tag 500 is wet. The panel tag 500 may have a total of ten characters. At the option of a requestor, the panel tag 500 may have either three or four large digits, serially numbered. A panel tag 500 with three large digits may have a prefix consisting of two numbers and two letters followed by one number, which may be serially numbered with the large digit numbers. Panel tags with four large digits may have a prefix printed consisting of two numbers and two letters.

Regarding character rand numeral printing sizes, in some implementations, the prefix digits remain constant or may change alphabetically with every ten-thousand tracking tags. The prefix numbers consist of the following (i) the first two characters are numeric and designate the state code, (ii) the next two characters are alphas and designate either livestock market, (iii) code or state roll over code, (iv) the next character is a digit and may be either small number that is printed in the prefix section or large size number and designates the first serial character in the numeric series from 0001 to 0000 (where "0000" is the ten-thousandth tag). Prefix numbers and letters may be in boldface Gothic Type Style and be one-quarter inch high. The large three or four digit numbers may be eleven-quarter inches high and a minimum of one-quarter inch wide boldface. There may be at least three-sixteenths inch space between each number. The number may be vertical with no protrusion to the left.

Regarding bar codes on the panel tag 500, there may be two types of bar codes as depicted in FIG. 5A. A top bar code 502 may be linear, one and thirteen-sixteenths to two inches long and seven-sixteenths inch high. A bottom bar code 504 may be a two-dimensional data matrix code measuring one-half inch square and centered on the left half of the panel tag 500 below the three or four large numbers of the panel tag 500 and horizontally aligned with a UHF icon 506 that is centered on the right half. The UHF icon 506 indicating that UHF RFID technology is being used by the panel tag 500. The bar codes may be clearly distinguishable from the large numbers with at least one-eighth inch clearance. The linear bar code may be a code and have a density of six characters per inch. The bar coding meets the American National Standards Institute (ANSI) standards grade of "B" or better. Each bar code will be encoded with the alpha/numeric identification characters visually present and encoded on (and in the RFID chip - UHF) the panel tag 500.

Regarding the UHF icon 506, in some implementations, the UHF icon 506 may be imprinted adjacent to the 2D bar code on the right side of the 2D bar code at the height of one-half inch.

Further regarding FIG. 5B, a wireless communication product (e.g., RFID chip 508) is depicted on a backside of the panel tag 500. Further, the RFID chip 508 may be capable of exchanging data with an external reader using radio frequency signals. In some implementations, the RFID chip 508 may include a built-in antenna and an integrated circuit. The antenna may send and receive radio waves, while the integrated circuit may modulate and demodulate the radio signals, as well as processing and/or storing data. For example, the RFID chip 508 may have the identification of the animal encoded thereon.

As depicted, RFID chip 508 is positioned as an inlay strip lengthwise across a portion of the length of the panel tag 500. In some implementations, positioning the RFID chip 508 in this manner may increase the durability and/or stiffness of the panel tag 500.

Figure 6:
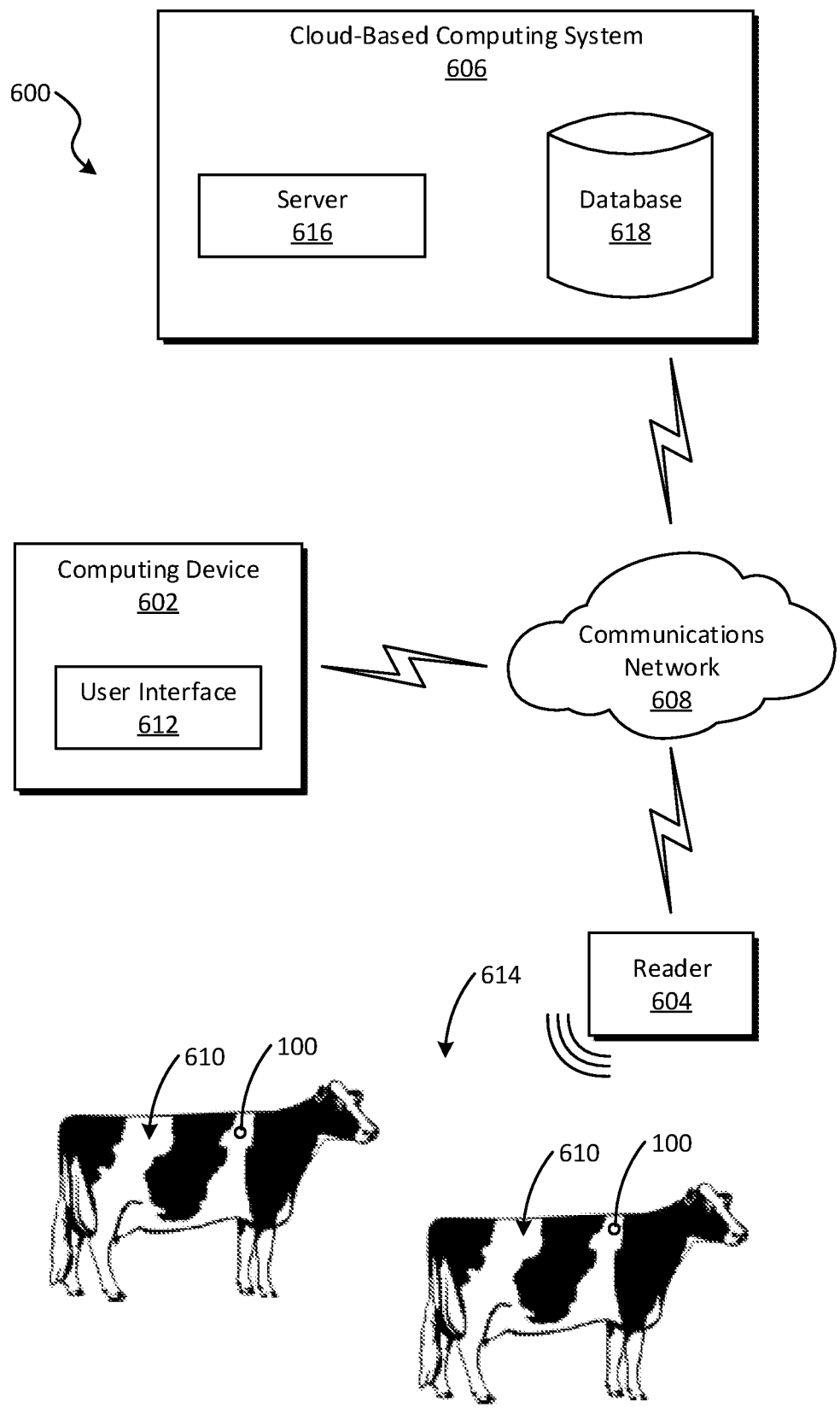
FIG. 6 is a block diagram of an example of a system for tracking cattle with the tracking tag of FIG. 1, in accordance with some implementations of the present disclosure.

FIG. 6 is a block diagram on an example of a system 600 for cattle tracking. The system 600 illustrated in FIG. 6 includes a computing device 602, a reader 604, and a cloud-based computing system 606 that are communicatively coupled via a communications network 608. As used herein, a cloud-based computing system refers, without limitation, to any remote or distal computing system accessed over a network link. Each of the computing device 602 and reader 604 may include one or more processing devices, memory devices, and network interface devices.

The network interface devices of the computing device 602 and the reader 604 may enable communication via a wireless protocol for transmitting data over short distances, such as Bluetooth, NFC, UHF, ZigBee, Z-Wave, etc. Additionally, the network interface devices may enable communicating data over long distances, and in one example, the computing device 602 and/or the reader 604 may communicate with the communications network 608. The communications network 608 may be a public network (e.g., connected to the Internet via wired (Ethernet) or wireless (Wi-Fi)), a private network (e.g., a local area network (LAN), wide area network (WAN), virtual private network (VPN)), or a combination thereof The reader 604 may include an integrated long-range antenna that supports a read range up between one hundred and six hundred feet. In some implementations, the reader 604 may include high-performance Application Specific Integrated Circuit (ASIC) radio technology to provide higher throughput so tracking animals 610 (e.g., cattle) via their tracking tags 100 may be performed more quickly and accurately. The reader 604 (one example of an "external reader") may include a display screen (e.g., touchscreen) that includes a light-emitting diode (LED) screen to display information pertaining to a tracking tag 100 read, such as the identification of the animal, a vaccine history of the animal, a birthdate of the animal, a location of the cattle, a sex of the animal, and so forth. The reader 604 may also include a physical keypad for a user to enter alphanumeric characters as desired.

The reader 604 may be a handheld device or included in a larger system that is located at a desired place to monitor animals to which the tracking tag 100 is affixed. For example, the reader 604 may be included in the computing device 602 that is located at a desired position on a ranch to monitor cattle as they ingress and egress certain areas.

The computing device 602 may be any suitable computing device, such as a laptop, tablet, smartphone, server, or computer. The computing device 602 may run a user interface 612 that is implemented in computer instructions stored on a memory device and that is executed by a processing device. The user interface 612 may present information pertaining to a tracking tag read, such as the identification of the animal, a vaccine history of the animal, a birthdate of the animal, a location of the cattle, a gender of the animal, and so forth.

Although just one reader 604 and computing device 602 are shown, it should be understood that there may be numerous readers 604 and/or computing devices 602 operated at a location 614 including animals 610. In some implementations, the reader 604 may transmit data read from a tracking tag 100 to the cloud-based computing system 606 and/or the computing device 602 for processing.

In some implementations, the cloud-based computing system 606 may include one or more servers 616 that form a distributed, grid, and/or peer-to-peer (P2P) computing architecture. Each of the servers 616 may include one or more processing devices, memory devices, data storage, and/or network interface devices. The servers 616 may be in communication with one another via any suitable communication protocol. The servers 616 may use a database 618 that stores the identifications associated with the animals being monitored and various information pertaining to those animals, such as their identification number, name, date of birth, vaccine history, sire, location, medical history, place of origin, owner, ranch or farm name, and the like.

In some implementations, the server 616 may perform analysis based on the location of the animals determined via the data received from the reader 604. For example, the server 616 may determine an animal is near a hazard and provide an alert to the reader 604 and/or the computing device 602 to indicate the same. In some implementations, the server 616 may determine that cattle has left their designated roaming area and provide an alert to the reader 604 and/or the computing device 602. In other instances, the server 616 may determine that cattle has a vaccine that is expired and needs to be re-administered based on the information stored in the database 618 that is correlated with the data received from the reader 604.

Figure 7:
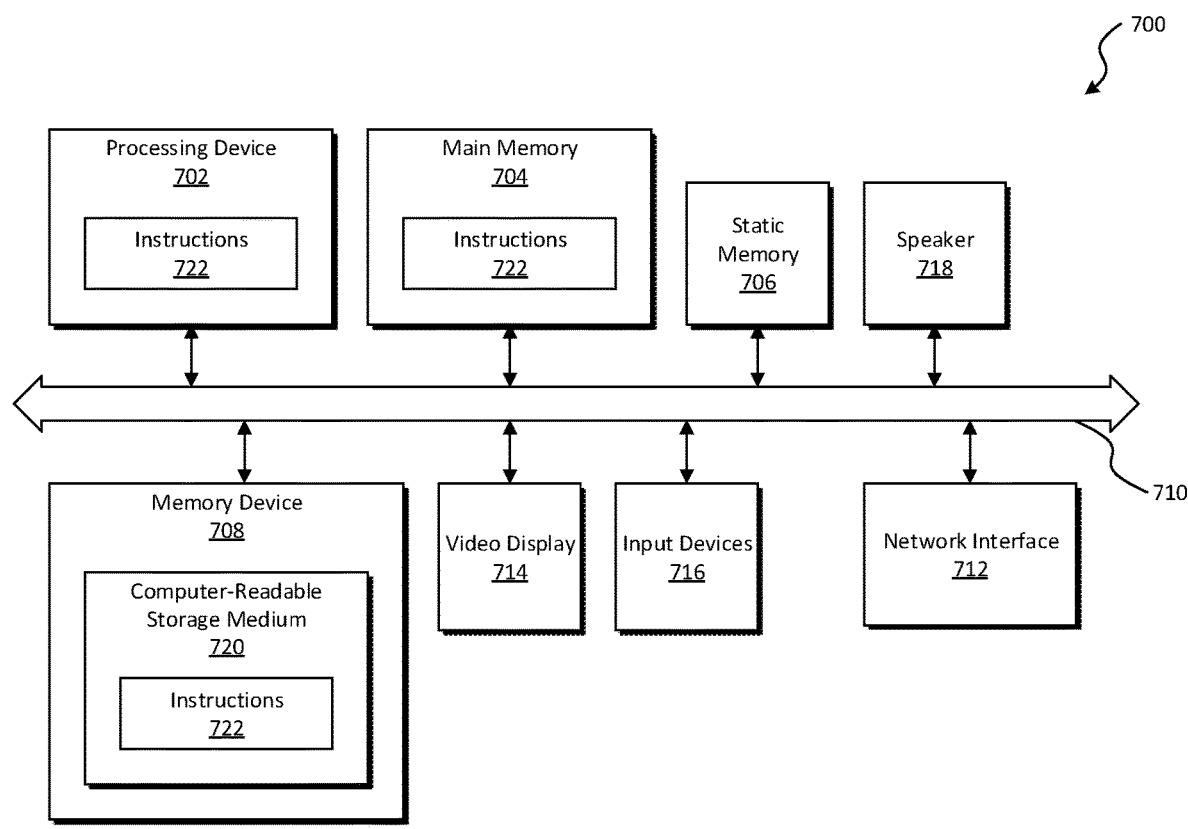
FIG. 7 is a block diagram of an example of a computer system, in accordance with some implementations of the present disclosure.

FIG. 7 is a block diagram of an example of a computer system 700. In some implementations, the computer system 700 may correspond to the computing device 602, reader 604, or one or more servers 616 of the cloud-based computing system 606 of FIG. 6. The computer system 700 may be capable of executing the user interface 612 of FIG. 6. The computer system 700 may be connected (e.g., networked) to other computer systems in a LAN, an intranet, an extranet, or the Internet. The computer system 700 may operate in the capacity of a server in a client-server network environment. The computer system 700 may be a personal computer (PC), a tablet computer, a server, a wearable (e.g., wristband), a set-top box (STB), a personal Digital Assistant (PDA), a mobile phone, a camera, a video camera, or any device capable of executing a set of instructions (sequential, parallel, or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 700 illustrated in FIG. 7 includes a processing device 702, a main memory 704 (e.g., read-only memory (ROM), solid state drive (SSD), flash memory, dynamic random access memory (DRAM) such as synchronous DRAM (SDRAM)), a static memory 706 (e.g., solid state drive (SSD), flash memory, static random access memory (SRAM)), and a memory device 708, which communicate with each other via a bus 710.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions for performing any of the operations and steps discussed herein.

The computer system 700 may further include a network interface device 712. The computer system 700 also may include a video display 714 (e.g., a liquid crystal display (LCD) or a cathode ray tube (CRT)), one or more input devices 716 (e.g., a keyboard and/or a mouse), and one or more speakers 718 (e.g., a speaker). In one illustrative example, the video display 714 and the input device(s) 716 may be combined into a single component or device (e.g., an LCD touch screen).

The memory device 708 may include a computer-readable storage medium 720 on which the instructions 722 embodying any one or more of the methodologies or functions described herein are stored. The instructions 722 may also reside, completely or at least partially, within the main memory 704 and/or within the processing device 702 during execution thereof by the computer system 700. As such, the main memory 704 and the processing device 702 also constitute computer-readable media. The instructions 722 may further be transmitted or received over the communications network 608 via the network interface device 712.

While the computer-readable storage medium 720 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 8A:
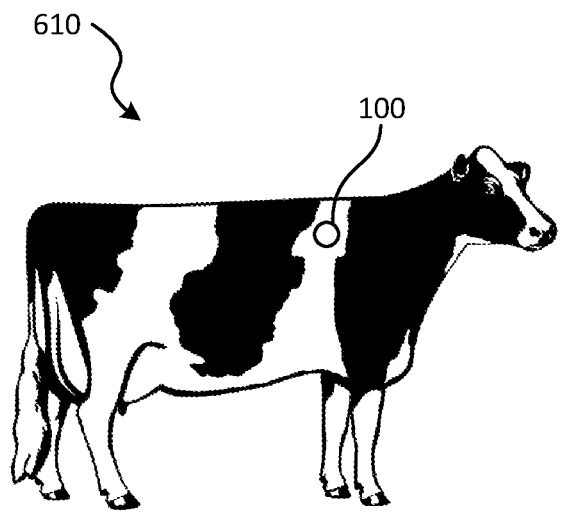
FIGS. 8A through 8C illustrate example placement locations of the tracking tag of FIG. 1 on cattle, in accordance with some implementations of the present disclosure.
Figure 8B:
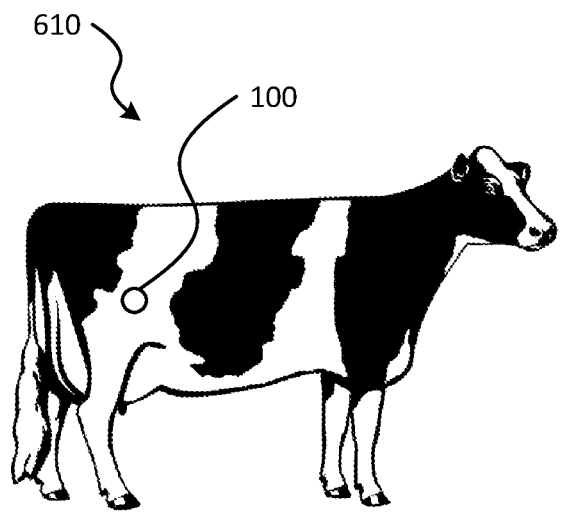
Figure 8C:
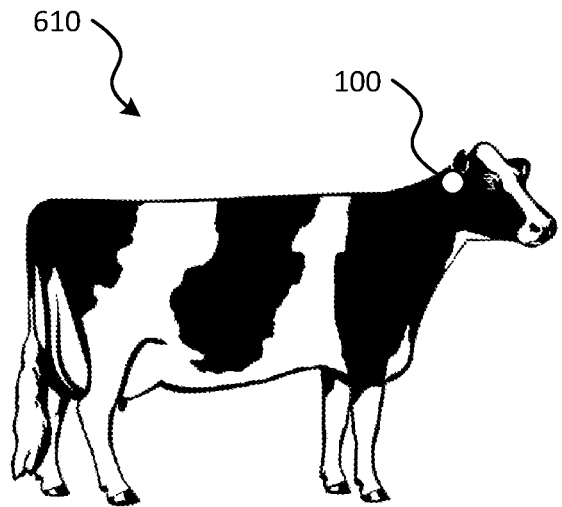

FIGS. 8A through 8C illustrate example placement locations of the tracking tag 100 on cattle according to certain implementations of the present disclosure. In FIG. 8A, the tracking tag 100 is placed on a back of the animal 610. In FIG. 8B, the tracking tag 100 is placed on a hip of the animal 610. The tracking tag 100 may be placed on the back or hip using an adhesive (e.g., certain type of glue or cement) that secures to the hair and/or skin of the animal 610. In some implementations, the tracking tag 100 may be secured to the back or hip using a mechanical attachment. In FIG. 8C, the tracking tag 100 is attached to an ear of the animal 610.

Consistent with the above disclosure, the examples of systems and methods enumerated in the following clauses are specifically contemplated and are intended as a non-limiting set of examples.

Clause 1. A tracking tag for cattle tracking, comprising:
a near-field communication (NFC) module programmed with a unique identifier;
a battery module coupled to the NFC module and configured to:
supply battery energy when active, and
activate when the NFC module is first read after being programmed with the unique identifier; and
a Bluetooth module coupled to the battery module, wherein the Bluetooth module configured to:
receive the battery energy from the battery module, and
transmit the unique identifier using a Bluetooth Low Energy (BLE) transmission protocol.

Clause 2. The tracking tag of any clause herein, further comprising a radio-frequency identification (RFID) chip programmed with the unique identifier.

Clause 3. The tracking tag of any clause herein, wherein the RFID chip is configured to communicate the unique identifier to an external reader using an ultra-high frequency.

Clause 4. The tracking tag of any clause herein, wherein the NFC module is further configured to:
harvest radio-frequency energy from an external reader when the NFC module is first read, and
supply the radio-frequency energy to the Bluetooth module.

Clause 5. The tracking tag of any clause herein, wherein the Bluetooth module is further configured to activate the battery module when the Bluetooth module receives the radio-frequency energy from the NFC module.

Clause 6. The tracking tag of any clause herein, wherein the BLE transmission protocol is a BLE beaconing protocol.

Clause 7. The tracking tag of any clause herein, wherein the Bluetooth module is further configured to:
set an advertising interval including a plurality of time slices, and
during each instance of the advertising interval randomly select one of the plurality of time slices, and
transmit the unique identifier during the one of the plurality of time slices.

Clause 8. The tracking tag of any clause herein, wherein the NFC module includes a non-volatile memory to store the unique identifier, and wherein the Bluetooth module is further configured to read the unique identifier from the non-volatile memory when the battery module is activated.

Clause 9. The tracking tag any clause herein, wherein the Bluetooth module includes a 2.4 gigahertz printed circuit board antenna.

Clause 10. The tracking tag of any clause herein, wherein the tracking tag is positioned on a back of an animal, a hip of the animal, or an ear of the animal.

Clause 11. A method for cattle tracking with a tracking tag comprising a near-field communication (NFC) module, a battery module, and a Bluetooth module, the method comprising:
programming the NFC module with a unique identifier;
performing a first read of the NFC module after the NFC module is programmed with the unique identifier;
responsive to the first read, activating the battery module to supply battery energy to the Bluetooth module; and
transmitting the unique identifier from the Bluetooth module using a Bluetooth Low Energy (BLE) transmission protocol.

Clause 12. The method of any clause herein, further comprising programming the unique identifier in a radio frequency-identification (RFID) chip of the tracking tag.

Clause 13. The method of any clause herein, further comprising communicating, with the RFID chip, the unique identifier to an external reader using an ultra-high frequency.

Clause 14. The method of any clause herein, further comprising:
harvesting, with the NFC module, radio-frequency energy from an external reader when the NFC module is first read; and
supplying the radio-frequency energy from the NFC module to the Bluetooth module.

Clause 15. The method of any clause herein, further comprising activating, with the Bluetooth module, the battery module when the Bluetooth module receives the radio-frequency energy from the NFC module.

Clause 16. The method of any clause herein, wherein the BLE transmission protocol is a BLE beaconing protocol.

Clause 17. The method of any clause herein, further comprising:
setting, with the Bluetooth module, an advertising interval including a plurality of time slices; and
during each instance of the advertising interval randomly selecting, with the Bluetooth module, one of the plurality of time slices, and transmitting, with the Bluetooth module, the unique identifier during the one of the plurality of time slices.

Clause 18. The method of any clause herein, further comprising:
storing the unique identifier in a non-volatile memory of the NFC module; and
reading, with the Bluetooth module, the unique identifier from the non-volatile memory when the battery module is activated.

Clause 19. The method of any clause herein, wherein the Bluetooth module includes a 2.4 gigahertz printed circuit board antenna.

Clause 20. The method of any clause herein, further comprising positioned the tracking tag on a back of an animal, a hip of the animal, or an ear of the animal.

No part of the description in this application should be read as implying that any particular element, step, or function is an essential element that must be included in the claim scope. The scope of patented subject matter is defined only by the claims. Moreover, none of the claims is intended to invoke 25U.S.C. § 104(f) unless the exact words "means for" are followed by a participle.

The foregoing description, for purposes of explanation, use specific nomenclature to provide a thorough understanding of the described implementations. However, it should be apparent to one skilled in the art that the specific details are not required to practice the described implementations. Thus, the foregoing descriptions of specific implementations are presented for purposes of illustration and description. They are not intended to be exhaustive or to limit the described implementations to the precise forms disclosed. It should be apparent to one of ordinary skill in the art that many modifications and variations are possible in view of the above teachings.

The above discussion is meant to be illustrative of the principles and various implementations of the present disclosure. Once the above disclosure is fully appreciated, numerous variations and modifications will become apparent to those skilled in the art. It is intended that the following claims be interpreted to embrace all such variations and modifications.

What is claimed is:

1. A tracking tag for cattle tracking, comprising:
a near-field communication (NFC) module programmed with a unique identifier;
a battery module coupled to the NFC module and configured to:
supply battery energy when active, and
activate when the NFC module is first read after being programmed with the unique identifier;
a Bluetooth module coupled to the battery module, wherein the Bluetooth module configured to:
receive the battery energy from the battery module, and
transmit the unique identifier using a Bluetooth Low Energy (BLE) transmission protocol; and
a radio-frequency identification (RFID) chip programmed with the unique identifier, wherein the RFID chip is configured to communicate the unique identifier to an external reader using an ultra-high frequency;
wherein the NFC module is further configured to:
harvest radio-frequency energy from an external reader when the NFC module is first read, and
supply the radio-frequency energy to the Bluetooth module; and
wherein the Bluetooth module is further configured to activate the battery module when the Bluetooth module receives the radio-frequency energy from the NFC module.

2. The tracking tag of claim 1, wherein the BLE transmission protocol is a BLE beaconing protocol.

3. The tracking tag of claim 2, wherein the Bluetooth module is further configured to:
set an advertising interval including a plurality of time slices, and
during each instance of the advertising interval randomly select one of the plurality of time slices, and transmit the unique identifier during the one of the plurality of time slices.

4. The tracking tag of claim 1, wherein the NFC module includes a non-volatile memory to store the unique identifier, and wherein the Bluetooth module is further configured to read the unique identifier from the non-volatile memory when the battery module is activated.

5. The tracking tag claim 1, wherein the Bluetooth module includes a 2.4 gigahertz printed circuit board antenna.

6. The tracking tag of claim 1, wherein the tracking tag is positioned on a back of an animal, a hip of the animal, or an ear of the animal.

7. A method for cattle tracking with a tracking tag comprising a near-field communication (NFC) module, a battery module, and a Bluetooth module, the method comprising:
programming the NFC module with a unique identifier;
performing a first read of the NFC module after the NFC module is programmed with the unique identifier;
responsive to the first read, activating the battery module to supply battery energy to the Bluetooth module;
transmitting the unique identifier from the Bluetooth module using a Bluetooth Low Energy (BLE) transmission protocol;
programming the unique identifier in a radio frequency-identification (RFID) chip of the tracking tag;
communicating, with the RFID chip, the unique identifier to an external reader using an ultra-high frequency;
harvesting, with the NFC module, radio-frequency energy from an external reader when the NFC module is first read;
supplying the radio-frequency energy from the NFC module to the Bluetooth module; and
activating, with the Bluetooth module, the battery module when the Bluetooth module receives the radio-frequency energy from the NFC module.

8. The method of claim 7, wherein the BLE transmission protocol is a BLE beaconing protocol.

9. The method of claim 8, further comprising:
setting, with the Bluetooth module, an advertising interval including a plurality of time slices; and
during each instance of the advertising interval randomly selecting, with the Bluetooth module, one of the plurality of time slices, and transmitting, with the Bluetooth module, the unique identifier during the one of the plurality of time slices.

10. The method of claim 7, further comprising:
storing the unique identifier in a non-volatile memory of the NFC module; and
reading, with the Bluetooth module, the unique identifier from the non-volatile memory when the battery module is activated.

11. The method of claim 7, wherein the Bluetooth module includes a 2.4 gigahertz printed circuit board antenna.

12. The method of claim 7, further comprising positioned the tracking tag on a back of an animal, a hip of the animal, or an ear of the animal.

\* \* \* \* \*